US005546200A

United States Patent [19]

Nicolas et al.

[11] Patent Number: 5,546,200
[45] Date of Patent: Aug. 13, 1996

[54] CHROMATIC LIGHT SEPARATOR AND PICTURE PROJECTOR USING A CHROMATIC LIGHT SEPARATOR

[75] Inventors: Christophe Nicolas, Bicetre; Brigitte Loiseaux, Villebon Sur Yvette; Cécile Joubert; Jean-Pierre Huignard, both of Paris, all of France

[73] Assignee: Thomson-CSF, Puteaux, France

[21] Appl. No.: 63,741

[22] Filed: May 20, 1993

[30] Foreign Application Priority Data

May 22, 1992 [FR] France .................... 92 06272

[51] Int. Cl.[6] .................. G02B 5/32; G03H 1/10
[52] U.S. Cl. .................. 359/15; 359/10; 359/19
[58] Field of Search .................. 359/11, 15, 10, 359/16, 19, 27

[56] References Cited

U.S. PATENT DOCUMENTS

| 4,850,685 | 7/1989 | Kamakura et al. |
|---|---|---|
| 4,938,550 | 7/1990 | Inagaki et al. ................ 359/15 |
| 5,011,284 | 4/1991 | Tedesco et al. |
| 5,198,928 | 3/1993 | Chauvin ................ 359/495 |
| 5,223,956 | 6/1993 | Kramer et al. ................ 359/495 |

FOREIGN PATENT DOCUMENTS

| 383646 | 8/1990 | European Pat. Off. |
|---|---|---|
| 492640 | 7/1992 | European Pat. Off. |
| 2222892 | 3/1990 | United Kingdom . |
| 2235849 | 3/1991 | United Kingdom . |
| 88/10545 | 12/1988 | WIPO . |

OTHER PUBLICATIONS

Y. Fumio, et al., Patent Abstracts of Japan, vol. 13, No. 375 (P–921), Aug. 1989. JP 1129205, "Hologram Deflector".
Y. Takahashi, Patent Abstracts of Japan, vol. 14, No. 27 (P–922) (3970), Jan. 19, 1990. JP 1–267612, "Projection Type Display Device".

*Primary Examiner*—Georgia Y. Epps
*Assistant Examiner*—Michael A. Papalas
*Attorney, Agent, or Firm*—Oblon, Spivak, McClelland, Maier, & Neustadt, P.C.

[57] ABSTRACT

This invention concerns chromatic light separators, and is particularly intended to reduce their dimensions. A chromatic separator in accordance with the invention contains at least two selective wave length mirrors. According to one characteristic of the invention, the two selective mirrors are nested holographic mirrors. The invention is particularly suitable for three-color rear-projection type picture projectors using liquid crystal screens.

16 Claims, 7 Drawing Sheets

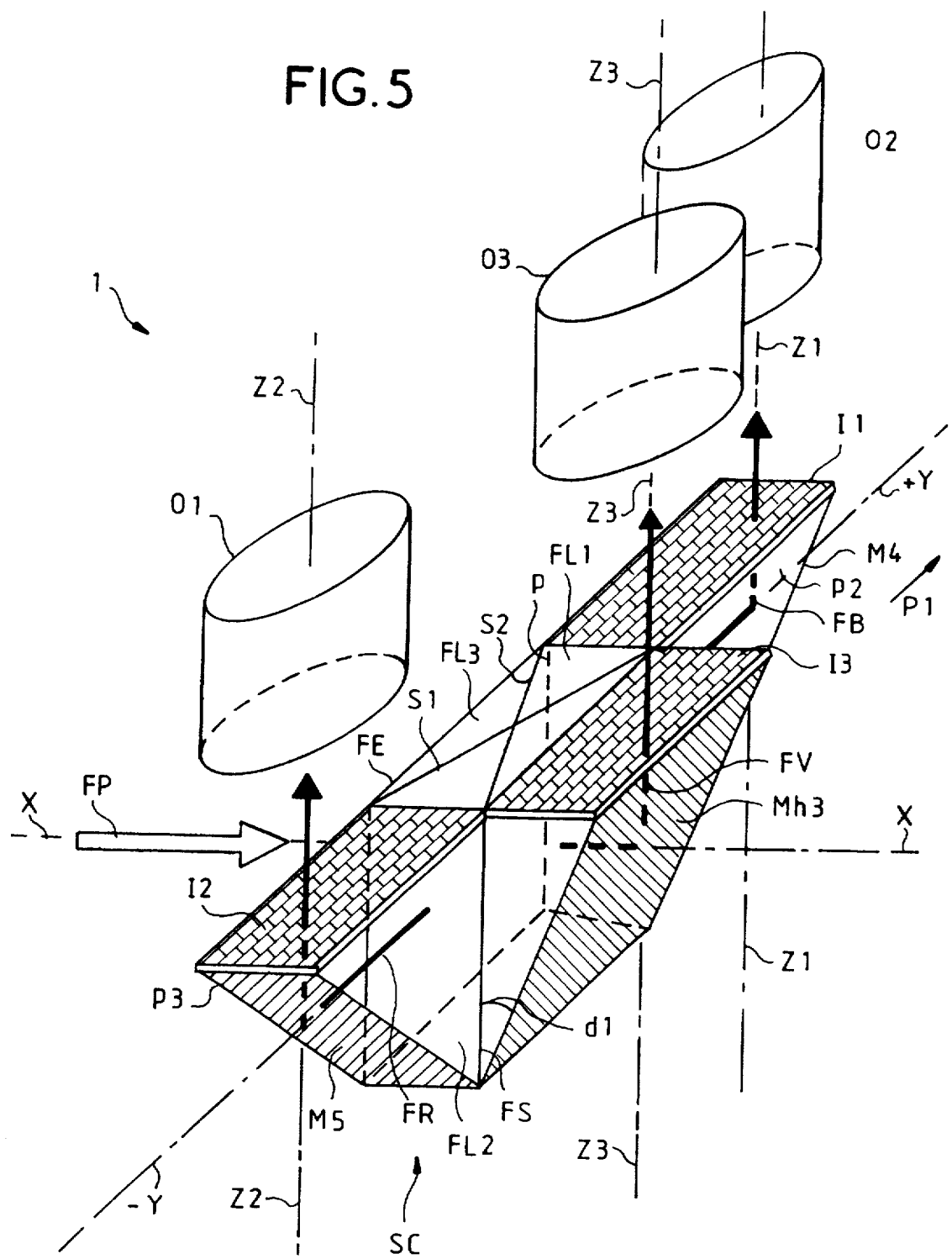

CHROMATIC LIGHT SEPARATOR AND PICTURE PROJECTOR USING A CHROMATIC LIGHT SEPARATOR

This invention concerns a chromatic light separator of the type that can form at least two monochrome beams each designed to be spatially modulated. It also concerns a picture projector using this type of chromatic separator.

As part of the development of high definition televisions, an attempt is made to obtain large picture sizes (of the order of one meter diagonal) in the 16/9 format (length to height ratio) and containing a large number, for example 1 million, pixels.

In order to generate this type of video picture, the current trend is towards picture projection devices using spatial light modulation techniques. In these projection devices, the polychrome picture is obtained by superimposition on a projection screen of three monochrome pictures, one red, one green and one blue. Each monochrome picture is firstly formed on the surface of a spatial light modulating screen called the "imager" throughout the rest of this description.

The imager usually consists of an L.C.D. (Liquid Crystal Display) type screen containing liquid crystal cells in a matrix layout, with each cell corresponding to a pixel. A beam of monochrome and polarized light is spatially modulated by the imager, and the projected picture is the result of this modulation.

In general, the different monochrome beams (green, red and blue) are obtained using a chromatic light separator device illuminated by a beam of white light. Note that the expression "monochrome beam" refers to a beam of colored light particularly a so-called primary color such as blue, green or red, unlike a beam of white light that contains several primary colors. Obviously such a monochrome beam could equally well be a relatively wide spectral band or a narrow spectral band of the monochromatic radiation type.

Pictures formed by the three imagers are projected onto the projection screen by means of a single objective common to the three monochrome pictures, or using three objectives, or in forward projection or in rear-projection.

This type of projector has an important advantage over cathode tubes in that it is more compact. However they are still relatively large, such that all manufacturers are attempting to reduce their size, particularly for rear-projection type projectors (overhead projectors) for which the entire length of optical paths between imagers and the projection screen lies within the total size.

Note that in these projectors using one or more LCD imagers to spatially modulate a monochrome beam, a large part of the overall size is due to the illumination device, namely the optical chromatic separation and light transport system, from the illumination source to each LCD imager.

This type of rear-projector is well known, and typical examples have been published particularly in the following two documents:

"100—in Extra-Slim Liquid-Crystal Rear-Projection Display", Fukuda et al. (Hitachi), SID 1991 Digest, p. 423;

"High Definition Liquid Crystal Projection TV", Noda et al. (Matsushita), Japan Display 1989, p. 256.

Another disadvantage of these picture projectors is that their light efficiency is low, particularly due to differences between the shape of the imager to be illuminated and the shape of the section of the light beam from the light source. Illumination sources normally used (for example arc lamp associated with a reflector) generally produce a light beam with a circular cross section. If it is required to illuminate a rectangular shape LCD imager with a circular beam, the rectangle must be inscribed within the circular cross section. In this case the ratio between the area of the rectangle and the area of the disk is 0.54 at the most. Therefore practically half of the energy is lost.

A French patent published under n°2 642 927 describes how to reduce the size of this type of picture projector using holographic mirrors instead of ordinary mirrors in the light transport optical system. The optical system is practically the same as in the first publication mentioned above: holographic mirrors are used instead of ordinary (metal) mirrors on the trajectory of the imager illumination beams. The resulting advantage is due to the fact that in this configuration, a holographic mirror does not respect Descartes law, in other words it can deviate light rays by 90° without necessarily being inclined at 45° from the incident beam. Compared with ordinary mirrors, holographic mirrors can therefore be inclined further for the same angle of deviation, thus reducing the dimensions of these mirrors.

Holographic elements or components in particular performing the functions of mirrors are well known in themselves. They are obtained by interference and can carry out complex optical functions in films such as described in document: "L. Solymar, D. J. Cooke, Volume Holography and Volume Gratings"— Academic Press (1981).

Properties of these holographic components in terms of angular or spectral selectivity or polarization are described through coupled wave formalism in a document by H. Kogelnik, Bell Syst. Tech. J. 48, p. 2909 (1969).

A holographic mirror such as that used in French patent n°2 642 927 mentioned above, consists of a volume hologram recorded in a photosensitive material.

FIG. 1 shows a classical method of recording a hologram. The photosensitive material M with refraction index n is deposited on a transparent plane support St, and one or several networks with periodic refraction indexes are recorded in this material using two beams F1, F2 with parallel rays. These two beams F1, F2 are output from the same laser source with a wave length $\lambda_0$ (measured in air), and they are propagated along two directions making an angle A between them in the medium with index n.

When these two beams intersect, light interference fringes Fi appear parallel to each other. The common direction of these fringes is the bisector of the two propagation directions of beams F1, F2. The light intensity in a direction perpendicular to fringes Fi and in a medium with a refraction index equal to n, is modulated by a sinusoidal profile with a period P given by the following relation:

$$P = \frac{\lambda_0}{2n \cdot \cos(A/2)}$$

In order to record a holographic mirror, the photosensitive material and its support are placed in the interference fringes field. Two types of photosensitive material are frequently used: dichromated gelatines and photopolymers. Exposure to light modifies the material refraction index. Interference fringes, alternatively light and dark following a sinusoidal profile, modulate the refraction index between the values $n_{max}$ and $n_{min}$. This modulation may be sinusoidal or may be of a different shape, for example square or trapezoidal as a function of the response of the photosensitive material (as a function of its recording resolution). This modulation may be fixed into the material by a chemical or photochemical fixing process. Note on FIG. 1 that the transparent support St may be inclined with respect to the fringes Fi.

FIG. 2 shows that after recording the index modulation in material M, if beam F2 is eliminated and the hologram is illuminated by beam F1, the recorded index fringes F1 behave like multiple mirrors. Beam Fi is deflected into a beam F'1 that is identical to beam F2 in FIG. 1.

Let R be one of the rays of beam F1. Each portion of a hologram containing a continuous index variation between $n_{min}$ and $n_{max}$ behaves like a mirror for ray R, and produces the reflected ray R'. The angle between rays R and R' (in the medium with index n) is equal to A. A simple variation of the index between $n_{min}$ and $n_{max}$ is not sufficient to completely deflect the ray R. Part of the energy continues to be propagated through the hologram and encounters other variations $n_{min}$ and $nma_x$, thus creating a multitude of rays R'. On the scale of beam F1, if there are enough fringes recorded in the hologram, the entire energy of beam F1 will be reflected into a beam F'1 which is the reconstitution of beam F2.

In practice, the result obtained is that a beam of parallel rays can be deviated by an angle A using a pseudo-mirror, or holographic mirror, for which the angle of inclination from the incident beam is not necessarily A/2 (this would necessarily be the case for a conventional mirror). There is therefore a potential gain in size compared with a conventional mirror.

One of the interesting properties of the holographic mirror is anamorphosis. We can see in the drawing in FIG. 2 that the width L' of beam F1 is narrower than width L of beam F1. This is not the case in a direction perpendicular to the plane of the figure. Therefore a beam with a square cross-section can be transformed into a beam with a rectangular cross section, or a beam with a circular cross section can be transformed into a beam with an elliptical cross section.

French patent application $n_o$ 90 14620 describes the use of holographic mirrors in a liquid crystal video projector, and states that by construction, these holographic mirrors perform an anamorphosis of the beam that can thus be adapted to the 16/9 format.

Holographic mirrors have another known property, namely that they are selective in wave length.

Holograms are recorded with laser light in order to produce interference s fringes. If the laser beam F1 is replaced on restitution by a beam of white light with the same geometry, a reflecting beam is obtained with a spectral distribution centered around $\lambda_0$: consequently the holographic mirror is also a dichroic mirror. By means of three holograms recorded with red, green and blue lasers, it is possible to manufacture an optical system that separates the three primary colors generally used for picture display. Note that for some photosensitive materials, one wave length is recorded and the index modulation is transformed by chemical treatment so that the mirror works at a different wave length.

Finally, note also the polarization property of the light presented by holograms. The reflection coefficient of a mirror depends on the direction of polarization of the beam of incident light. In particular at the Brewster angle of incidence, the reflection coefficient cancels out for the polarization direction parallel to the incidence plane. The reflected radiation is therefore polarized in the direction perpendicular to the plane of incidence. For a ray incident to an air-mirror interface, and if the mirror medium has a refraction index equal to, for example, 1.5 (the index for air being equal to 1), the Brewster angle is equal to 56° 40'.

Photosensitive materials also have a refraction index significantly equal to that of glass, namely 1.5. When the index fringes are recorded in the material, it is done by index variations around this average value. A typical maximum modulation value is $n_{max}-n_{min}=0.14$.

A holographic mirror does not follow Descartes laws, but a ray incident on the layer of photosensitive material will follow the laws of refraction. In other words, a ray cannot reflect on the fringes network until after it has penetrated into the medium with index n=1.5. Thus reflection on the network of index fringes must be considered as a reflection of a ray coming from a medium with index n=1.5 onto a medium with an average index n=1.5. These considerations are also applicable when rays firstly cross the transparent support (glass index 1.5) of the holographic mirror before entering the photosensitive material.

We can show that if the refraction indexes of the two media of an interface-mirror are equal, the Brewster angle is equal to 45°. An angle of incidence of 45° (in the medium with index 1.5) therefore produces a reflected beam that is polarized in a direction perpendicular to the index plane. This polarizing property of holographic mirrors is particularly useful for the illumination of liquid crystal type imagers.

The invention concerns an optical light chromatic separation device called a light chromatic separator, and its objective is to make very compact separators of this type.

For this purpose, the invention proposes to use holographic mirrors recorded in volume, firstly in order to create a highly compact assembly, and secondly in order to take advantage of all the other properties of this type of mirror, particularly anamorphosis of the section of light beams in order to improve the light energy efficiency.

According to the invention, a chromatic light separator illuminated by a beam of white light called the primary beam containing at least two mirrors with selected wave lengths each reflecting a monochrome beam, is characterized in that at least two of the selected mirrors are holographic mirrors nested inside each other.

The term "nested inside each other" refers to a layout in which the planes of the holographic mirror intersect, in other words are crossed.

This type of nesting is useful, particularly in that it makes it easier to reduce the size of the mirrors, gives perfect symmetry of the trajectory of monochrome beams and is capable of simultaneously using all properties of holographic mirrors.

The invention also concerns a picture projector using this type of light chromatic separator. It has a particularly useful (but not exclusive) application in projectors with rear-projection, in which it is easier than with forward projection, to project each monochrome picture onto the projection screen using an objective dedicated to each imager.

BRIEF DESCRIPTION OF DRAWINGS

In attempting to understand the invention and the advantages that it provides, it will be helpful to read the following description of some of its construction methods with reference to the figures in the appendix:

FIG. 5 diagrammatically shows a picture projector according to the invention;

FIG. 3 schematically shows chromatic light separator SC in accordance with the invention. The chromatic separator SC is formed in a parallelepiped shaped prism p containing several mirrors Mh1, Mh2.

According to one characteristic of the invention, at least two of these mirrors Mh1, Mh2 are holographic mirrors nested within each other.

Figure 4A:
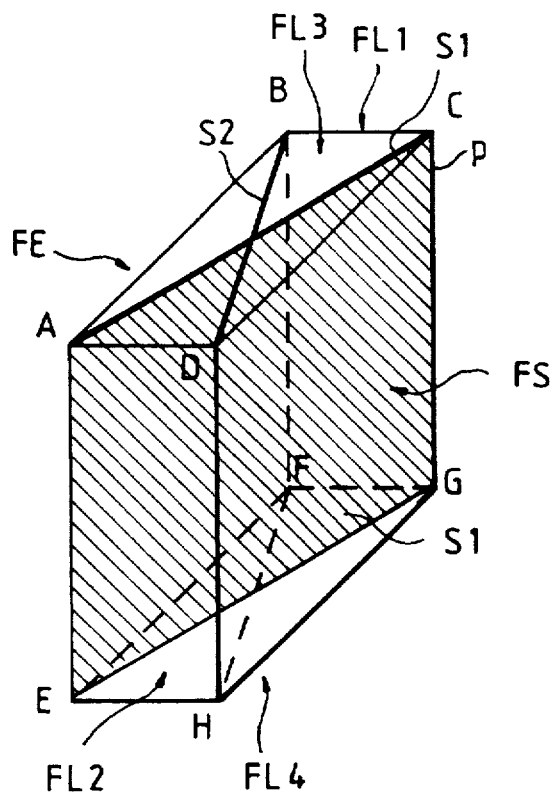
FIGS. 4a and 4b are perspective views of a parallelepiped prism used to make the chromatic separator in the invention.
Figure 4B:
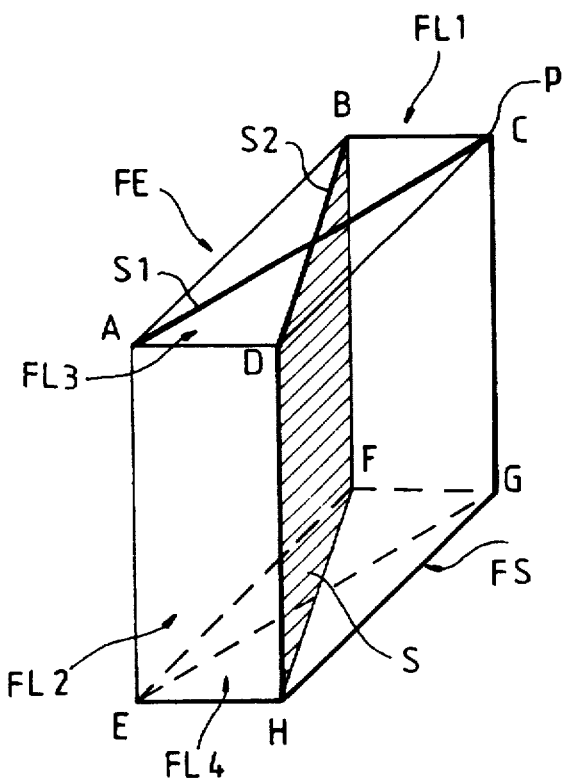

FIGS. 4a and 4b are perspective views showing the prism parallelepiped p in order to better situate the positions of the two nested holographic mirrors Mh1 and Mh2.

Parallelepiped p in the example has two large opposite square faces FE, FS; its other four faces, referred to as side faces FL1, FL2, FL3 and FL4 are rectangular and it may be useful to make them with a 16/9 format, as explained in more detail later in the description.

The corners of the parallelepiped are identified A to H. If the parallelepiped is cut by two planes, one of which passes through corners A, C, E, G and the other passes through corners B, D, H, F, the first and second diagonal surfaces are defined as S1 and S2 and are materialized on FIG. 4a and 4b respectively.

These two diagonal surfaces S1 and S2 intersect each other, and each represents the position of a holographic mirror Mh1, Mh2 in a chromatic separator SC in accordance with the invention.

Referring again to FIG. 3, the figure shows the parallelepiped p in a top view, in other words holographic mirrors Mh1, Mh2 extend perpendicularly to the plane of the figure. The two holographic mirrors Mh1, Mh2 are nested, and their faces S1, S2 form diagonal surfaces that intersect with each other, in the same way as surfaces S1, S2 on FIGS. 4a, 4b.

Parallelepiped p is made of a transparent material, for example glass or plastic. One of its large square faces FE, called the entry face, is illuminated by a beam of white light called the primary beam FP. The primary beam FP is collimated along the direction of its propagation axis X. The propagation axis X is normal to the plane of the entry face FE and passes through the center of it, and therefore through the line formed by the intersection of the two nested mirrors Mh1, Mh2.

Figure 1:
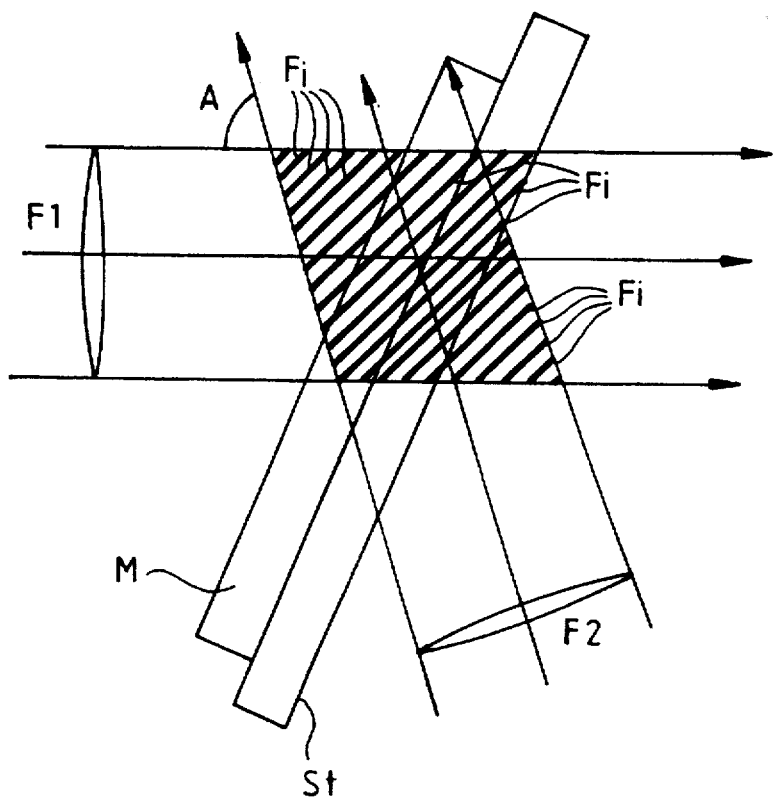
FIGS. 1 and 2 described above, showing prior art, and diagrammatically showing holographic mirrors.
Figure 2:
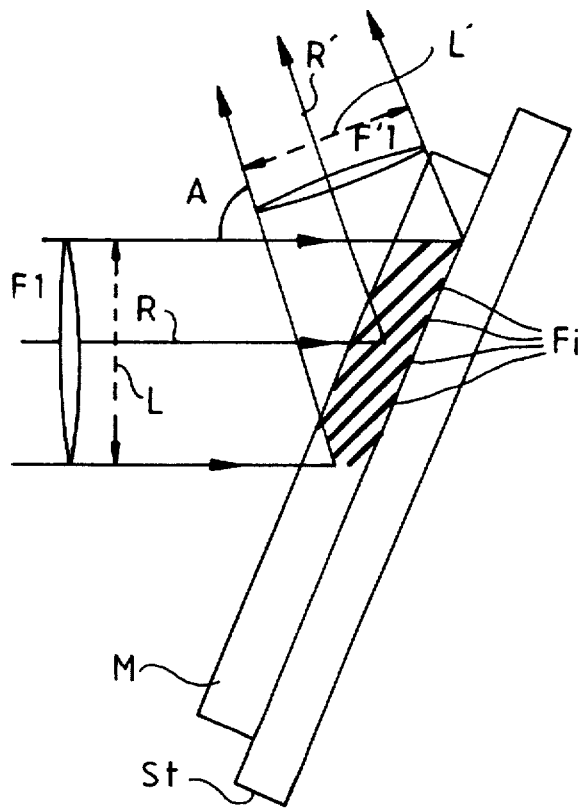
Figure 3:
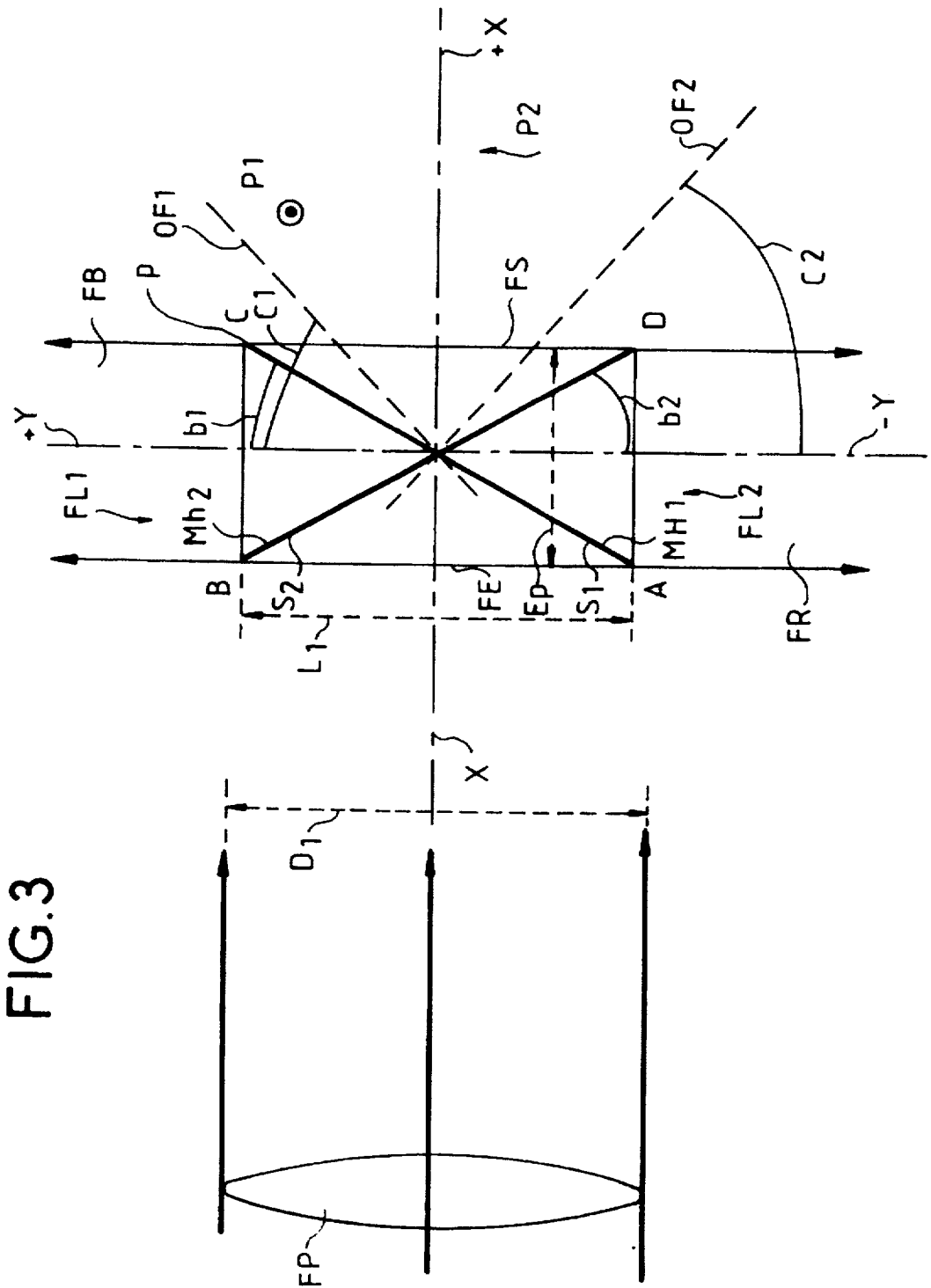
FIG. 3 is a sectional schematic view of a light chromatic separator according to the invention.

On FIG. 3, holographic mirrors Mh1 and Mh2 are shown simply by a thick line, although obviously each includes a transparent support on which a layer of photosensitive material is deposited (forming the entire surface of the mirror S1, S2), in which holograms are traditionally recorded with the required characteristics of these mirrors, using known techniques. Consequently interference fringes (not shown) similar to the interference fringes Fi shown in FIGS. 1 and 2 have been recorded in the photosensitive layers in the two holographic mirrors Mh1, Mh2.

Thus each holographic mirror Mh1, Mh2 may be made such that, under the effect of illumination by the primary beam FP, it reflects a monochrome beam FB, FR of a different color to that of the beam reflected by the other mirror: for example blue for the first monochrome beam FB from the first holographic mirror Mh1, and red for the second beam FR from the second holographic mirror Mh2.

In the non-limitative example described, the holograms defining mirrors Mh1, Mh2 have been recorded such that the two monochrome beams FB, FR are reflected in opposite directions located on the same −Y +Y axis perpendicular to the X propagation axis of the primary beam FP; this is true for a symmetrical inclination of these mirrors with respect to the −Y +Y axis, at an angle of inclination b1, b2; the −Y +Y axis is divided by the X axis into a +Y part and a −Y part that represents the propagation axis of the blue monochrome beam FB and the propagation axis of the red monochrome beam FR, respectively.

Under these conditions, for each holographic mirror Mh1, Mh2, the index fringes (not shown on FIG. 3) have a general orientation (shown by dashed lines marked OF1, OF2 in FIG. 3) such that they are inclined symmetrically at angles c1, c2 from 45° from the monochrome beam −Y, +Y propagation axes: more specifically the index fringes for the first holographic mirror Mh1 bisect +Y and +X, (where +X is the part of the X propagation axis located on the side opposite the entry face FE for the monochrome beams FB, FR +Y, −Y propagation axes); the index fringes for the o second holographic mirror Mh2 bisect −Y and +X.

If angle b1, b2 at which the holographic mirrors Mh1, Mh2 are inclined is not equal to the angle c1, c2 of orientation of their index fringes, an anamorphosis will be made.

Thus for example, assuming that the primary beam FP has a circular cross section with a diameter D1 equivalent to the diagonal of the entry face FE of the parallelepiped p, and this face is square, the maximum amount of light energy can thus be extracted from the primary beam FP. And if also holographic mirrors Mh1, Mh2 work as described above for angles of inclination b1, b2 equal to 29.36°, an anamorphosis will be made from a square to a 16/9 format rectangle. This type of anamorphosis makes it possible to keep all energy taken from the primary beam FP by holographic mirrors Mh1 and Mh2 in each of the monochrome beams FB, FR, and each of these beams will have a rectangular section which in the non-limitative example described will be in the 16/9 format.

In this configuration, the section of each monochrome beam FB, FR is rectangular, with a dimension equal to the length L1 of one side of the entry face FE in a plane perpendicular to the plane of the figure, and a smaller dimension in the plane of the figure corresponding to the thickness Ep of the prism p. In fact, the section of monochrome beams FB, FR corresponds to the shape of the opposite side faces FL1, FL2 through which these beams exit from the prism p.

Another advantage of this configuration, in which holographic mirrors Mh1, Mh2 reflect monochrome beams FB, FR in directions of 90° from the direction of the incident primary beam FP, without being oriented at 45°, is that the size of mirrors Mh1, Mh2 parallel to the thickness Ep of the prism is reduced.

In the configuration shown in FIG. 3, if the light in the primary beam FP has no specific polarization direction, monochrome beams FB, FR acquire a single polarization direction P1 perpendicular to the planes of incidence, and which is shown on FIG. 3 perpendicular to the plane of the figure. In fact reflections are polarizing, because firstly the angle c1, c2 of incidence of rays in the primary beam FP on the index fringes of holographic mirrors Mh1, Mh2 is 45°, and secondly the average refraction index of each fringe grating is equal to the index of the glass.

Since holographic mirrors have determined spectral passbands, they are calculated such that the second mirror Mh2 reflects a red component at 90° in the −Y direction, and that the first Mh1 reflects a blue component at 90° in the +Y direction. These components are polarized perpendicularly to the planes of incidence. The complementary red and blue components, in other words for which the polarization directions P2 are parallel to the plane of incidence (and therefore shown on FIG. 3 parallel to the plane of incidence) pass through the parallelepiped p along the X axis without being affected. Similarly, light belonging to the spectral band in which mirrors Mh1 and Mh2 are not sensitive, crosses through the parallelepiped p without being affected and emerges from it through the second square face or exit face FS opposite to the entry face FE.

A chromatic separator in accordance with the invention with two nested holographic mirrors as shown in FIG. 3, can be applied to all illumination devices using at least two monochrome beams obtained from white light.

Obviously, the operation described above is applicable regardless of the color of monochrome beams reflected by the two nested holographic mirrors, if the two beams have different colors.

Also, in order to make one or several other beams in addition to the two monochrome beams FB, FR, it is only necessary to process the light that exits from the prism p through its exit face, and select the required components.

Color separation and/or anamorphosis can be done by the chromatic separator SC in the invention, independently of selection of the polarization direction, in other words the separator SC in the invention may be illuminated by a previously polarized radiation, preferably along the polarization direction P1. The invention can therefore be associated with any radiation polarization system, particularly of the type that separates the two orthogonal polarization components and rotates one of them by 90°, as described for example in the French patent application n°90 13942.

FIG. 5 contains a perspective view schematically showing a picture projector 1 with three primary colors, using a chromatic separator SC in accordance with the invention in order to illuminate three rectangular imagers I1, I2, I3 located in the same plane.

The chromatic separator SC is made as in the example in FIG. 3, using a prism or parallelepiped p in which the first and second holographic mirrors Mh1, Mh2 are nested.

The entry face FE of the separator SC is illuminated by a white light beam or primary beam FP (marked by an arrow drawn in a thick line), moving along the X axis. The first and second holographic mirrors Mh1, Mh2 reflect the first and second monochrome beams FB, FR that exit from the parallelepiped p through the first and second side faces FL1, FL2 respectively, and along the +Y, −Y propagation axis, these two beams FB, FR having the same polarization direction P1 as explained above with reference to FIG. 3.

Among other components, light that exits from the parallelepiped p through the exit face F S contains the primary green component that is selected by a 90° reflection on a third holographic mirror Mh3. This mirror Mh3 reflects a third monochrome beam RG, with wave length corresponding to the green, along a propagation axis Z3 which is vertical in the example in FIG. 5. The first, second and third monochrome beams FB, FR and FG correspond to blue, red and green respectively, and will be modulated by the first, second and third imagers I1, I2, I3 respectively. Each imager I1 to I3 is a screen capable of spatially modulating light, in itself using known techniques. In the non-limitative example described, these imagers I1, I2 and I3 are liquid crystal matrix screens with the same format as for side faces FL1, FL2, FL3, namely rectangular in the example, and particularly in the 16/9 format.

In the non-limitative example described, the three imagers I1, I2 and I3 are located in the same plane (or in a parallel and close plane) as the plane containing the third side face FL3 of parallelepiped p; this third side face is the face which, in the top of the parallelepiped p, connects the first and second side faces FL1, FL2 through which the first and second monochrome beams FB, FR exit.

The third holographic mirror Mh3 sensitive to the green component reflects this component along the Z3 axis in the form of a third monochrome beam towards the top of the figure at 90° from the X axis along which the primary beam FP propagates. For this purpose, the third holographic mirror Mh3 may be made so that it can be inclined with respect to the parallelepiped exit face FS by an angle d1 of the same value as the angle of inclination b1, b2 (shown in FIG. 3) in order to limit the size, and also to make the square—>rectangle anamorphosis: the square corresponds to the exit face FS, and the rectangle corresponds to the shape of imagers I1 to I3, or more precisely to the third imager I3 which is inserted on the trajectory of the third monochrome beam FG.

Concerning the two imagers I1, I2 to be used to modulate the first and second monochrome beams FB, FR respectively, these imagers are placed on each side and as close as possible to the third side face FL3 of prism p, such that they extend it, in other words their length is added to the length of the third side face; a third side (corresponding to the length) of this third side face is bounded by the third imager I3.

The first and second monochrome beams FB (blue) and FR (red) are reflected by 90° with respect to their +Y, −Y propagation axis in the direction of the first and second imagers I1, I2 respectively, by means of fourth and fifth mirrors M4, M5 respectively.

These fourth and fifth mirrors may be either ordinary mirrors or holographic mirrors because there is no anamorphosis or component selection to be made since these functions have been done by the first and second holographic mirrors Mh1, Mh2.

After reflection on mirrors M4, M5, the first and second monochrome beams FB, FR propagate in the direction of imagers I1, I2 along axis Z1, Z2 parallel to the Z3 axis along which the third monochrome beam FG propagates in the direction of the third imager I3.

Each of the monochrome beams FB, FR, FG passes through an imager I1, I2, I3 which may possibly modulate it to enable it to become a picture carrier, from which it emerges to be propagated in the direction of a projection objective O1, O2, O3, in itself conventional. Each projection objective O1, O2, O3 is also assigned to a single monochrome beam FB, FR, FG, that it focuses using known techniques onto a projection screen (not shown) common to the three modulated beams.

Obviously, imagers I1, I2 and I3 may be laid out in various ways: for example the first and second imagers I1, I2 may be placed directly on side faces FL1, FL2 through which the first and second monochrome beams FB, FR exit from the prism or parallelepiped p. But it is useful to place these imagers or LCD screens I1, I2, I3 in a plane that contains the third side face FL3, in order firstly to have an equal distance between each imager I1, I2, I3 and the projection objective O1, O2, O3 with which it is associated; and secondly so that the distance between imager and objective is as short as possible.

In order to restrict the number of interfaces (air-transparent material) that cause losses of light by reflection, it is useful to design a single piece structure:

the fourth and fifth mirrors M4, M5 may each be made by metallizing one face of an additional prism p2, p3 at 45° (to prevent any confusion, the first prism formed by the parallelepiped p is called "main prism" in the rest of this description). The supplementary prisms p2, p3 are placed one in contact with the first side face FL1, and the other in contact with the second side face FL2.

the third holographic mirror Mh3 may consist of a third supplementary prism made of transparent material on one face, inclined by an angle dl with respect to the exit face FS from the first prism p, and is covered with a layer of photosensitive material (not shown) in which the hologram forming the third holographic mirror Mh3 is recorded.

There is thus continuity of the refraction index between the entry face FE of the first prism p and the position of each imager or LCD screen I1, I2, I3. Due to this index continuity, reflection on the third holographic mirror Mh3 is polarizing: only the green component polarized vertically with respect to the plane of incidence on the third mirror Mh3 is reflected by this mirror to make the third monochrome beam FG.

The three monochrome beams FB, FR, FG are thus made by blue, red and green components respectively polarized along the same direction P1 parallel to the +Y propagation axis.

Spatial modulation screens or LCD type imagers generally have two polarizers (not shown): the first polarizer located at the side of their illumination face F1, filters the light in order to allow only light with a first given polarization direction to pass; and the second polarizer located at the side of the display face opposite to the illumination face, displays polarization direction rotation caused by modulation of the LCD screen.

In the projector according to the invention, since the three blue, red and green components (forming the monochrome beams FB, FR, FG)illuminating the screens or LCD imagers I1, I2, I3 are polarizing, the first of the polarizers mentioned above on each LCD screen may possibly be eliminated. This is an advantage since normal polarizers usually increase the temperature of the LCD due to the fact that they operate on the principle of absorbing undesirable radiation. However if it is required to keep these first polarizers in a projector according to the invention, for example in order to increase picture contrast, the temperature increase problem is not serious since incident radiation on these first polarizers is already polarized.

If the polariization direction forced on monochrome beams FB, FR, FG is not optimum for the performances of imagers or LCD screen I1, I2, I3, a conventional λ/2 retarding plate may be placed on the trajectory of these beams, for example immediately in front of the LCD screen adjacent to its illumination face F1, particularly adapted to the color of the monochrome beam FB, FR, FG modulated by this LCD screen (for example a piece of double refraction plastic material). Thus, the polarization direction of monochrome beams or FB, FR, FG illumination beams may be rotated to be in a particularly favorable direction for operation of the LCD screens I1, I2, I3.

Figure 6:
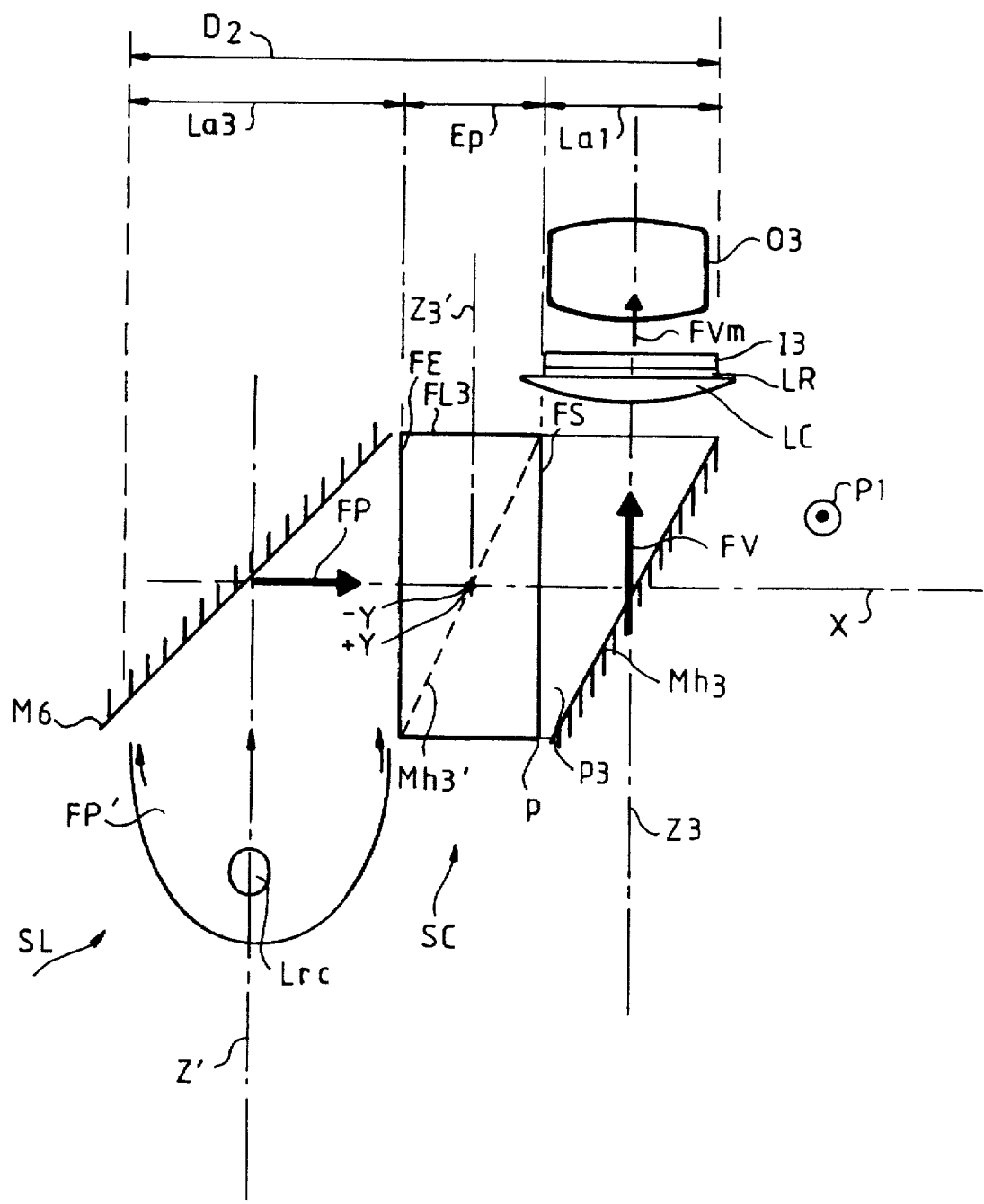
FIG. 6 is a sectional view of the picture projector shown in FIG. 5.

Note that optical paths between the entry face FE and imagers I1, I2, I3 are not necessarily exactly equal to each other, and it may be necessary to insert a lens made by known techniques on the trajectory of one or several components, to assist in concentrating light in the rectangular aperture of the imager. FIG. 6 is a schematic view of a picture projector 1 in accordance with the invention, and illustrates its compactness. FIG. 6 shows a view of the projector in FIG. 5 along a section parallel to the first and second side faces FL1, FL2 of the main prism p, the plane of this section passing through the intersection line of the two nested holographic mirrors Mh1, Mh2. Consequently compared with FIG. 5, FIG. 6 does not show the first and second imagers I1, I2 (blue and red) in particular, which are in a deeper and less deep plane respectively than that shown in FIG. 5.

The main prism p or parallelepiped appears in the form of a rectangle that corresponds to the first or second side face FL1, FL2, whereas the entry and exit faces FE, FS extend perpendicularly to the plane of the figure.

The entry face FE is illuminated by the white light beam or primary beam FP. The primary beam FP results from emission of light by a light source SL, for example made up of an arc lamp Lrc placed at the focal point of a parabolic reflector RP. Light emitted by the source SL forms a beam of white light FP' propagating in the direction of a sixth mirror M6 along a propagation axis Z' parallel to the entry and exit faces FE, FS of the main prism p.

The sixth mirror M6 may be a "cold type mirror": firstly it reflects the useful part of the spectrum, in other words visible light forming the primary beam FP, by 90° along the X propagation axis; secondly, by transmission along the Z' axis, it eliminates infrared and ultra violet radiations.

The primary beam FP encounters the chromatic separator SC containing the main prism p in which the first and second holographic mirrors Mh1, Mh2 are nested (not shown on FIG. 5). The two holographic mirrors Mh1, Mh2 reflect the first and second monochrome beams FB, FR (not shown on FIG. 5) along the +Y, −Y propagation axis perpendicular to the plane of the figure.

The rest of the light forming the primary beam FP then exits from the main prism p through its exit face F S, and penetrates into the third supplementary prism p3 supporting the third holographic mirror Mh3, sensitive to the green in the example.

The third holographic mirror Mh3 reflects the third monochrome beam FG composed of the green component, polarized along the polarization direction P1 perpendicular to the plane of the figure as already described with reference to FIG. 5. The third monochrome beam FG is reflected along the propagation axis Z3 parallel to the entry and exit faces FE, FS in the direction of the third imager I3. After passing through imager I3, the third monochrome beam carries a picture and forms a third modulated beam FGm that propagates along axis Z3 in the direction of the OG projection objective.

FIG. 6 shows a field lens LC placed in front of the third imager I3 on the trajectory of the third monochrome beam FG. The field lens LC converges the rays of the third monochrome beam FG, FGm into the aperture of the third projection objective OG. Note in the case of a picture projector with three LCD type screen imagers, in general the three imagers are each associated with a field lens of this type. Consequently for this entire description, the term imager or LCD screen refers to a field lens plus LCD screen assembly.

Also, FIG. 6 shows a λ/2 retarding plate LR, placed between the field lens LC and the third imager I3; it should also be considered that this type of retarding plate is also placed in front of the other imagers I1, I2. However the presence of this retarding plate LR is not always compulsory, it may be added in order to rotate the polarization direction as previously explained, so that this polarization direction is the optimum for operation of an LCD screen type imager.

With this type of layout, the size of projector 1 in the invention is particularly small along the X propagation axis of the primary beam FP, and this is the axis along which the size of a complete rear-projector is appreciated. Along the X axis, the size D2 reduces to the width La1 of the third imager I3 plus the thickness Ep of the main prism p plus the width of the parabolic reflector RP, due to the fact that the dimension of elements useful to the first and second monochrome beams FB, FR is measured in a plane perpendicular to the plane in FIG. 5.

Another important advantage resulting from this type of layout is that for each channel or color, the distance between the projection objective and its imager may be minimum since there is no optical component placed on the trajectory between these two elements.

It is well known that liquid crystal screen or LCD type imagers are characterized by a "solid acceptance angle". If we wish that the contrast of an LCD screen remains above a given value, incident angles of rays illuminating the LCD screen must be restricted; they must be contained within a given solid angle.

In the general case, this solid angle does not have any axial symmetry; it is extended along a particular direction. This direction bisects the directions of the two polarizers (mentioned previously) of an LCD screen. The geometric acceptance extent of the LCD is equal to the product of its area and its solid acceptance angle.

Another advantage of the invention is that it can match the solid angle of illumination rays to the solid acceptance angle. The square—>rectangle anamorphosis is accompanied by a deformation of the solid angle of illumination rays. Thus in the case of a beam passing through a square surface with a solid angle with axial symmetry, as in the case of a primary beam FP passing through the square shaped entry face FE, if all the energy removed from this beam by an anamorphosizing holographic mirror (such as mirrors Mh1, Mh2 or Mh3) is forced through a rectangular surface (such as side faces FL1, FL2), there will be a reduction in the diaphragm dimension in one direction. Consequently there will be an increase in the solid angle for rays in this direction such that the geometric extent of the beam is maintained.

In the examples shown in FIGS. 4 and 5, we can see that it is possible to illuminate rectangular surfaces (those for imagers I1, I2, I3) with a polarization direction parallel to the length of the rectangles. However the solid angle of the rays is extended in the direction of the width of the rectangles. Thus if the solid acceptance angle of an LCD screen is to be extended in the direction of its width, the radiation illuminating it must be polarized at 45°.

Consequently a λ/2 retarding plate could be placed in front of imagers I1 to I3, in the same way as the retarding plate LR is placed in front of the third imager I3, in order to make the radiation polarization direction coincide with the optimum polarization direction for the LCD screen, while adapting the solid illumination angle to the solid acceptance angle of the LCD screen. Obviously each retarding plate thus inserted in front of an imager I1, I2, I3 must be adapted to the color of the monochrome beam thus treated.

Note that the dimension of the picture projector along the X axis may be reduced even further, at the expense of somewhat more complexity in manufacturing of the first main prism or parallelepiped p. This is done by including the third holographic mirror Mh3 in the first principal prism p, in a position such that it would lie in this prism in a plane parallel to the plane that it would occupy when placed outside as shown in FIG. 5.

An example of this construction is shown in FIG. 6, by means of a dotted line marked Mh3' which symbolizes this new position of the third holographic mirror Mh3. Obviously in this configuration, the assembly formed by the field lens LC, the retarding plate LR, the third imager I3 and the third projection objective O3, would itself also be moved in order to be placed above the third side face FL3 on the new reflection axis Z' of the third holographic mirror Mh3'. The characteristics and properties of the third holographic mirror Mh3 as described previously remain unchanged in the new position of this mirror. This new layout of the third holographic mirror does not modify the position of elements that are used to treat the two monochrome beams FB, FR.

Figure 7:
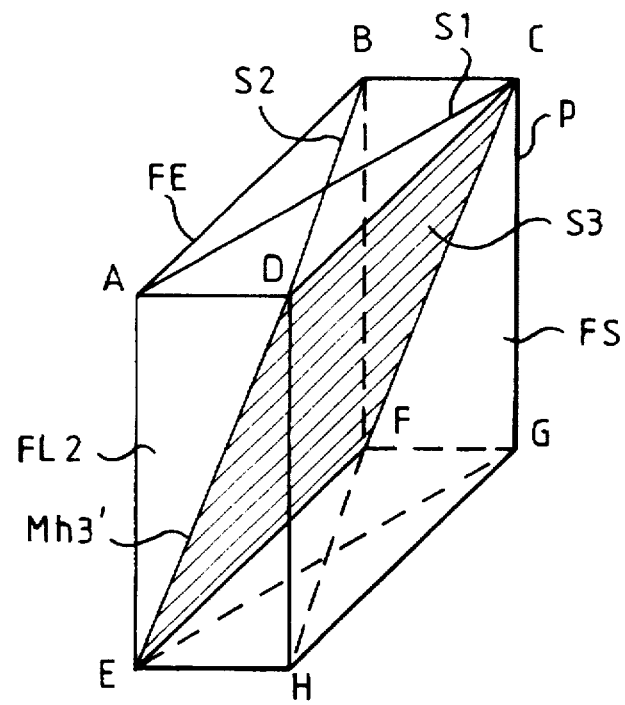
FIG. 7 shows another form of construction of the chromatic separator in the invention.

FIG. 7 shows the parallelepiped or first prism p, in order to illustrate the construction method in which the third holographic mirror Mh3' is contained in this first prism.

A third surface S3 is materialized within parallelepiped p, representing the s "reflecting" face of the third mirror Mh3'. This third surface S3 is delimited by corners D, C, E and F of parallelepiped p. Consequently in this situation, the third surface S3 is nested with the first and second surfaces S1, S2, in other words the three holographic mirrors Mh1, Mh2, Mh3' are nested with each other.

Nested holographic mirrors Mh1, Mh2, Mh3 may be made, for example, by breaking down the parallelepiped p along the planes of each of the different mirrors that it contains.

Figure 8:
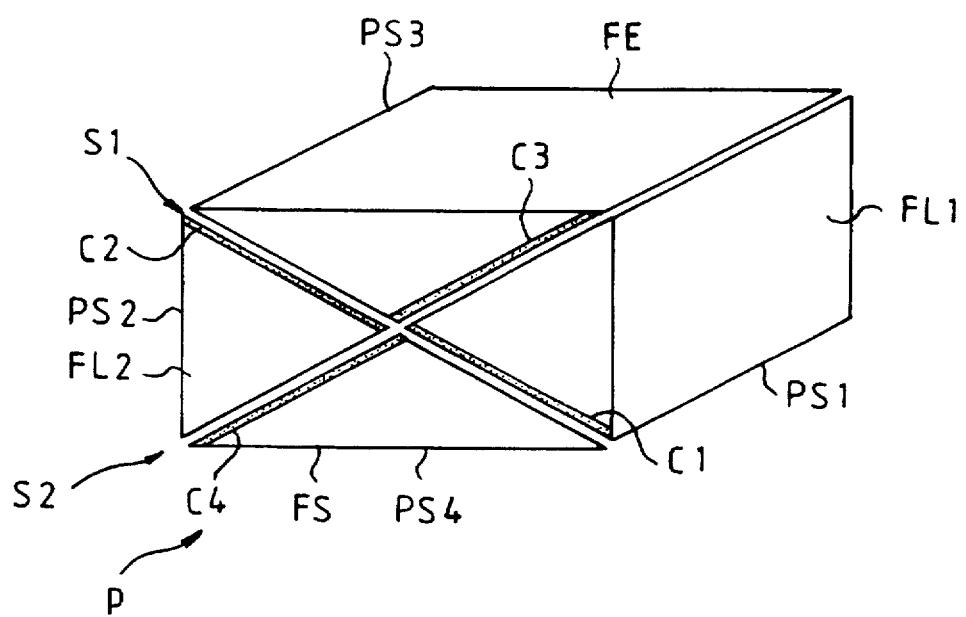
FIG. 8 shows a section of the parallelepiped shown in FIGS. 4a and 4b, that can be used to make the two nested mirrors shown on FIG. 3.

FIG. 8 illustrates a non-restrictive example showing the main prism or parallelepiped p being cut along two nested planes, producing four secondary prisms PS1 to PS4 in order to make the first and second nested holographic mirrors Mh1, Mh2.

Layers C1 to C4 of this photosensitive material are placed on the inner faces of these secondary prisms, in order to be able to reconstitute the two diagonal surfaces S1, S2 (shown on FIGS. 4a, 4b) intended to form the first and second holographic mirrors Mh1, Mh2. Each diagonal surface S1 and S2 is formed using two layers C1, C2 and C3, C4, located so as to be extensions of each other, in other words they are in the same plane when the parallelepiped is formed.

In the non-restrictive example described, each diagonal surface S1, S2 is obtained by two layers C1, C2 and C3, C4 placed on the inner surfaces of opposite secondary prisms PS1 to PS4:

the first diagonal surface S1 is formed by a first and second secondary prism PS1, PS2 placed opposite to each other, and which in the example are those with external faces forming side faces FL1, FL2.

the second diagonal surface S2 is formed using a third and fourth secondary prism PS3, PS4 placed opposite to each other, and which in the example have external faces corresponding to entry and exit faces FE, FS.

Obviously, either or both diagonal surfaces may be obtained in different ways, for example they could be formed from photosensitive layers deposited on adjacent secondary prisms.

The two secondary prisms forming a diagonal surface S1, S2 are then placed in the position that they will occupy when they form the chromatic separator SC, and they are exposed to interferences produced by two beams in order to record the hologram corresponding to a holographic mirror Mh1, Mh2.

Figure 9:
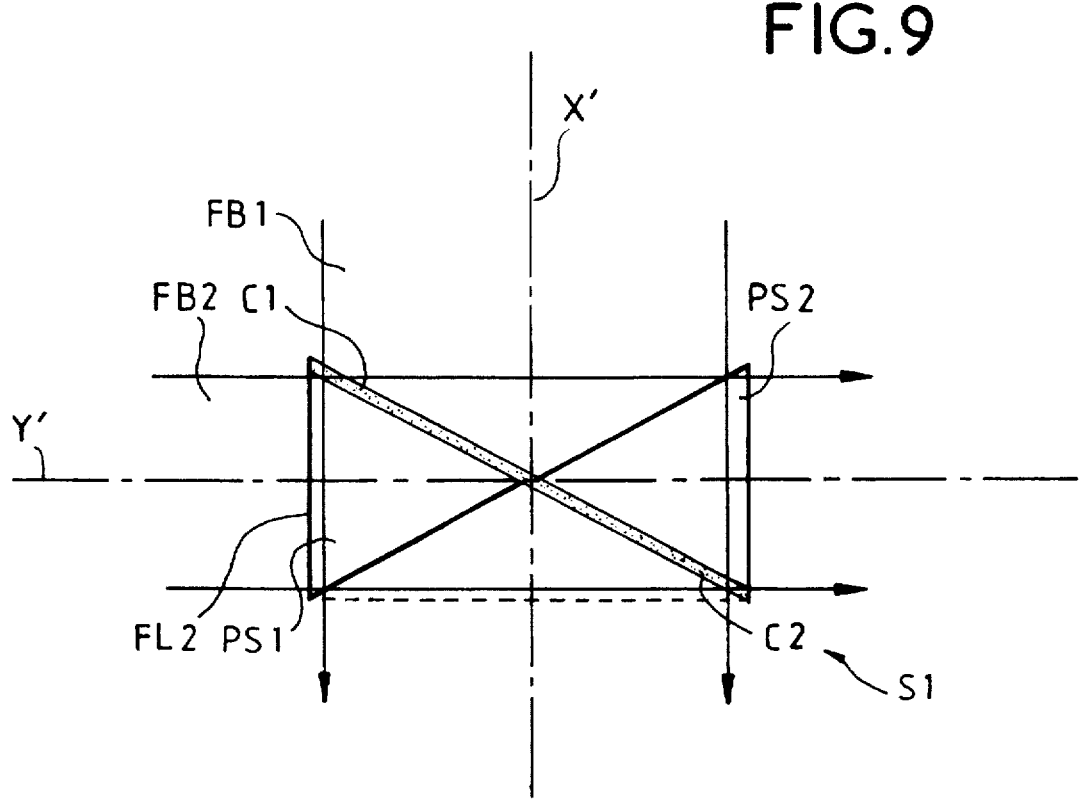
FIGS. 9 and 10 each illustrate specifically the construction of one and the other of the two nested mirrors shown in FIG. 3.

FIG. 9 schematically shows the first and secondary prisms PS1, PS2 exposed to two recorded beams FB1, FB2 in order to make the first holographic mirror Mh1.

In the example, since this first mirror Mh1 is sensitive to the blue, the two recording beams FB1, FB2 originate from the same laser source (not shown) emitting in the blue.

The first recording beam FB1 is propagated in the direction of the two secondary prisms PS1, PS2 along the X' axis.

The two secondary prisms PS1, PS2 are placed such that the first diagonal surface S1 (formed by layers C1, C2) are oriented with respect to the X' axis in the same way as the first holographic mirror Mh1 is oriented with respect to the propagation X-axis of the primary beam FP (see FIG. 3).

The second recording beam FB2 is propagated in the direction of the two secondary prisms PS1, PS2, along a propagation axis Y' perpendicular to the X' axis. This second recording beam is incident to the first secondary prism PS1, on one of its external faces forming the second side face FL2. The hologram corresponding to the first holographic mirror Mh1 is thus recorded using principles already described in the preamble.

Figure 10:
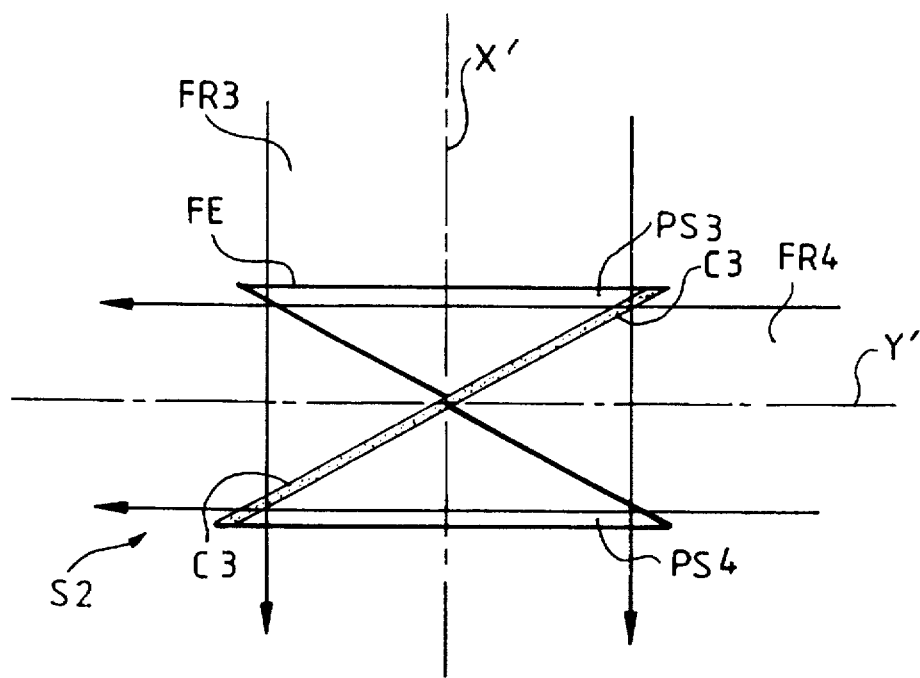

FIG. 10 schematically shows the third and fourth secondary prisms PS3, PS4 exposed to a third and fourth recording beam FR3, FR4 in order to make the second holographic mirror Mh2. These two recording beams are emitted by the same laser source (not shown), which is red in the example.

The third recording beam FR3 is propagated in the direction of the two secondary prisms PS3, PS4 along the same propagation axis X' as shown in FIG. 9. These two prisms PS3, PS4 are laid out such that the second diagonal surface S2 (formed by the third and fourth layers C3, C4) is oriented with respect to the X' axis in the same way as the second mirror Mh2 is oriented with respect to the propagation X-axis of the primary beam FP. Consequently, the third recording beam FR3 is incident on an external face of the third secondary prism PS3, that corresponds to the entry face FE of parallelepiped p.

The fourth recording beam FR4 is propagated in the direction of the two secondary prisms PS3, PS4 along a propagation axis Y' perpendicular to the X' axis of the third recording beam FR3. The fourth recording beam FR4 actually propagates along the same axis as the second recording beam FB2 (shown in FIG. 9), but in the opposite direction.

The hologram corresponding to the second holographic mirror Mh2 is thus recorded using known techniques described in the preamble.

When holographic mirrors Mh1, Mh2 have been recorded, the four secondary prisms PS1 to PS4 are assembled in order to make up the main prism or parallelepiped. If necessary, an index matching material may be used for this assembly between two prisms. When parallelepiped p is reconstituted, it forms a chromatic separator SC for two colors. A supplementary prism p3 may be added to this basic chromatic separator supporting the third holographic mirror Mh3 in order to separate a third component, as shown on FIGS. 5 and 6.

This chromatic separator SC may also be added to as shown in FIGS. 5 and 6 in order to return each component to a spatial modulating screen or imager.

Note that it is also possible to record holograms on a flexible support, particularly made of plastic. After fixing holograms by a classical photographic process, they may be transferred (adhered) for example to the surface of a glass prism.

Another method may consist of using photosensitive materials that are only sensitive to some spectral ranges. Photopolymers are known that are only sensitive in the red, and there are others that are only sensitive in the green-blue range. Parallelepiped p may therefore be assembled coated with layers of different photosensitive materials on each separating surface, and parallelepiped p may be exposed successively to different wave lengths of laser light.

We claim:

1. A chromatic light separator for illumination by a primary light beam, said separator comprising:

at least two holographic mirrors for reflecting first and second wavelengths of light, respectively, and thereby producing first and second monochrome beams from said primary light beam, said two mirrors intersecting each other within a prism, wherein said prism is a rectangular parallelepiped having two opposing square shaped faces and four non-square rectangular faces, said two square shaped faces serving as entry and exit faces, respectively, for said primary light beam which passes through said prism, wherein each of said holographic mirrors has a planar general orientation at an angle from said entry face not equal to 45° and comprises holographic index fringes; said fringes being at a non-zero angle from said general orientation, so that a square portion of an incident beam undergoes anamorphosis from a square shape to a rectangular shape while being reflected by said mirror.

2. The separator according to claim 1, wherein said four rectangular side faces of said parallelepiped are in 16/9 format.

3. The separator according to one of claims 1 or 2, further comprising:

a third holographic mirror disposed adjacent to said exit face of the parallelepiped so as to be intersected by said axis of propagation of said primary beam, and for producing a third monochrome beam.

4. The separator according to claim 1, wherein said holographic mirrors are selective in polarization direction, so that a desired polarization may be imparted to each of said monochrome beams.

5. The separator according to claim 1, wherein said first and second monochrome beams have different wavelengths.

6. The separator according to claim 1, wherein said first and second monochrome beams have the same direction of polarization.

7. The separator according to claim 1, further comprising means for reflecting said monochrome beams along respective propagation axes which are parallel to each other and in the same direction.

8. The separator according to claim 7, further comprising first, second and third supplementary prisms for supporting fourth and fifth mirrors and said third holographic mirror, respectively, said third supplementary prism being adjacent to said parallelepiped exit face, and said first and second supplementary prisms being coupled adjacent to said two opposing rectangular side faces of the parallelepiped, respectively.

9. A picture projector, comprising:

a source of visible light;

at least two non-square rectangular imagers spatially modulating monochrome beams with different wavelengths; and a chromatic light separator including at least two holographic mirrors for reflecting first and second wavelengths of light, respectively, and thereby producing first and second monochrome beams from said primary light beam, said two mirrors intersecting each other within a prism, wherein said prism is a rectangular parallelepiped having two opposing square shaped faces and four non-square rectangular faces, said two square shaped faces serving as entry and exit faces, respectively, for said primary light beam which passes through said prism, wherein each of said holographic mirrors has a planar general orientation at an angle from said entry face not equal to 45° and comprises holographic index fringes, said fringes being at a non-zero angle from said general orientation, so that a square portion of an incident beam undergoes anamorphosis from a square shape to a non-square rectangular shape while being reflected by said mirror.

10. A chromatic light separator for illumination by a primary light beam, said separator comprising:

at least two planar chromatic holographic mirrors for reflecting first and second wavelengths of light, respectively, and thereby producing first and second monochrome beams from said primary light beam, said at least two mirrors intersecting each other within a prism, wherein each of said planar mirrors includes holographic index fringes at a non-zero angle with respect to a general orientation of said each planar mirror to provide anamorphosis.

11. A separator according to claim 10, wherein said non-zero angle of the fringes of each of said mirrors is such that a square portion of a light beam incident on said mirror undergoes an anamorphosis to a rectangular shape in 16/9 format.

12. A separator according to claim 10, wherein said general orientation of each of said mirrors is approximately 60° from an axis of propagation of said primary light beam incident on said mirror, and said fringes are at 45° angles from said axis.

13. An image projector, comprising:

a source of visible light;

at least two imagers spatially modulating monochrome beams with different wavelengths; and a chromatic light separator including at least two planar holographic mirrors for reflecting first and second wavelengths of light, respectively, and thereby producing first and second monochrome beams from said visible light, said at least two mirrors intersecting each other within a prism, wherein each of said mirrors includes holographic index fringes at a non-zero angle with respect to a general orientation of said each mirror to provide anamorphosis.

14. An image projector according to claim 13, wherein said imagers have a rectangular shape.

15. An image projector according to claim 14, wherein said imagers have a rectangular shape substantially in 16/9 format.

16. An image projector according to claim 13, wherein the general orientation of each of said mirrors is approximately 60° from an axis of propagation of a primary light beam coming from said source and incident on the mirror and the orientation of the index fringes of the mirror is 45° from said axis, said non-zero angle being approximately 15°.

* * * * *